United States Patent [19]
Gindy et al.

[11] 3,918,266
[45] Nov. 11, 1975

[54] ICE WEIGHING MACHINE

[75] Inventors: Irving W. Gindy; Edwin L. Lauterstein, both of San Antonio, Tex.

[73] Assignee: Gindy Distributing Company, San Antonio, Tex.

[22] Filed: Mar. 25, 1974

[21] Appl. No.: 454,681

Related U.S. Application Data

[63] Continuation-in-part of Ser. No. 311,333, Dec. 1, 1972, abandoned.

[52] U.S. Cl. ..................... 62/137; 62/344; 141/83; 177/120
[51] Int. Cl.² ............................................. F25C 1/00
[58] Field of Search ........ 222/55, 236; 177/80, 120; 141/82, 83; 62/344, 137

[56] References Cited
UNITED STATES PATENTS

| | | | |
|---|---|---|---|
| 3,173,506 | 3/1965 | Clamp | 177/120 X |
| 3,265,226 | 8/1966 | Malcolm | 222/236 |
| 3,329,223 | 7/1967 | Swanson et al. | 177/80 |
| 3,387,750 | 5/1968 | Stencil | 222/236 |

*Primary Examiner*—Robert B. Reeves
*Assistant Examiner*—John P. Shannon
*Attorney, Agent, or Firm*—Cox, Smith, Smith, Hale & Guenther Inc.

[57] ABSTRACT

An ice cube dispensing and weighing unit having an elongated bin including a sloping side wall and a horizontal conveyor at the bottom. From the horizontal conveyor at the bottom of the elongated bin, the ice cubes are raised to a convenient dispensing level with an inclined conveyor. Ice is dispensed from the inclined conveyor into a bag that rests on a hinged plate, which is supported on the bottom opposite the hinge by a force control switch. Upon receiving a predetermined amount of ice in the bag, as previously selected, the force control switch will cut off the dispensing and weighing unit. The motor drive for the horizontal and inclined conveyor is positioned below the sloping wall of the elongated bin. The refrigeration unit for making the ice cubes is located at the bottom of the dispensing and weighing unit. The position for inserting and removing bags of ice is at a convenient level that does not require excessive bending and stooping. Safety switches stop the motor drive if a predetermined time has passed, or if a door enclosing the bag being filled is opened.

8 Claims, 4 Drawing Figures ial number 311,333

ICE WEIGHING MACHINE

The present application is a continuation-in-part of United States patent application serial number 311,333 filed on December 1, 1972 and having one of the same inventors as the present invention which has subsequently been abandoned.

BACKGROUND OF THE INVENTION

The present invention relates to a dispensing apparatus and is more particularly concerned with machine for dispensing and weighing quantities of ice cubes.

BRIEF DESCRIPTION OF THE PRIOR ART

A variety of different ice cube dispensing units have been tried and have found a degree of success. These have ranged from bagged-ice storing and dispensing units to the more recent, and quite sophisticated, coin operated, bulk storage, weighed-unit dispensing machines. These latter have enjoyed a more recent interest since they form their own cubes; store them in bulk, and dispense them on demand without the former cost of daily or frequent reloading by a labor crew with a refrigerated truck.

However, these more recent machines have fallen prone to a form of over-design or over-sophistication in that they employ weight saving mechanisms such as springs or springs and levers. While these may be impressive with regards to shipping weight of the dispensing machine, they exact an undue price in terms of reliability of the machine when in use, and occasion unduly high servicing cost in keeping the machines functioning, and more particularly with respect to the weighing mechanism which requires frequent adjustment. Because the tension or compression strength of the spring continually changes, frequent adjustments have to be made. Repeatability of an exact weight with a spring controlled weighing apparatus is very sporadic and changes drastically with use. To account for the unreliability of spring type of weighing mechanisms, previous ice dispensing units would over compensate by simply giving several pounds of ice in excess over the amount desired by the purchaser.

Because of the problems with the weighing mechanism, none of the prior units have been found to be entirely satisfactory.

SUMMARY OF THE INVENTION

In general, the preferred form of the present invention comprises an ice cube dispensing machine including an ice cube maker, a bulk storage bin for receiving and storing the ice cubes, and a dispensing means for delivering ice from the bin to a weighing stage.

It is an object of the present invention to use a force control switch to obtain accurate weights of the ice dispensed in a variety of pre-selected amounts.

It is a further object of the present invention to have an override mechanism wherein an individual could not obtain an undue amount of ice by holding the bag off of the weighing mechanism.

It is a further object of the present invention to have, in combination, an ice cube maker, a bulk storage bin for receiving and storing ice cubes from the ice cube freezer, means for dispensing ice from the storage bin, means for weighing the amount of ice dispensed, and an override delay to cut off the machine after enough time has elapsed for the pre-selected amount of ice would have been dispensed under the most unfavorable conditions.

It is yet another object of the present invention to provide a means for counting the number of the various size bags of ice that have been dispensed from the dispensing and weighing machine.

It is yet another object of the present invention to provide an elevation auger for raising the ice dispensed to a convenient level not requiring excessive stooping or bending.

DESCRIPTION OF THE PREFERRED EMBODIMENT

Figure 1:
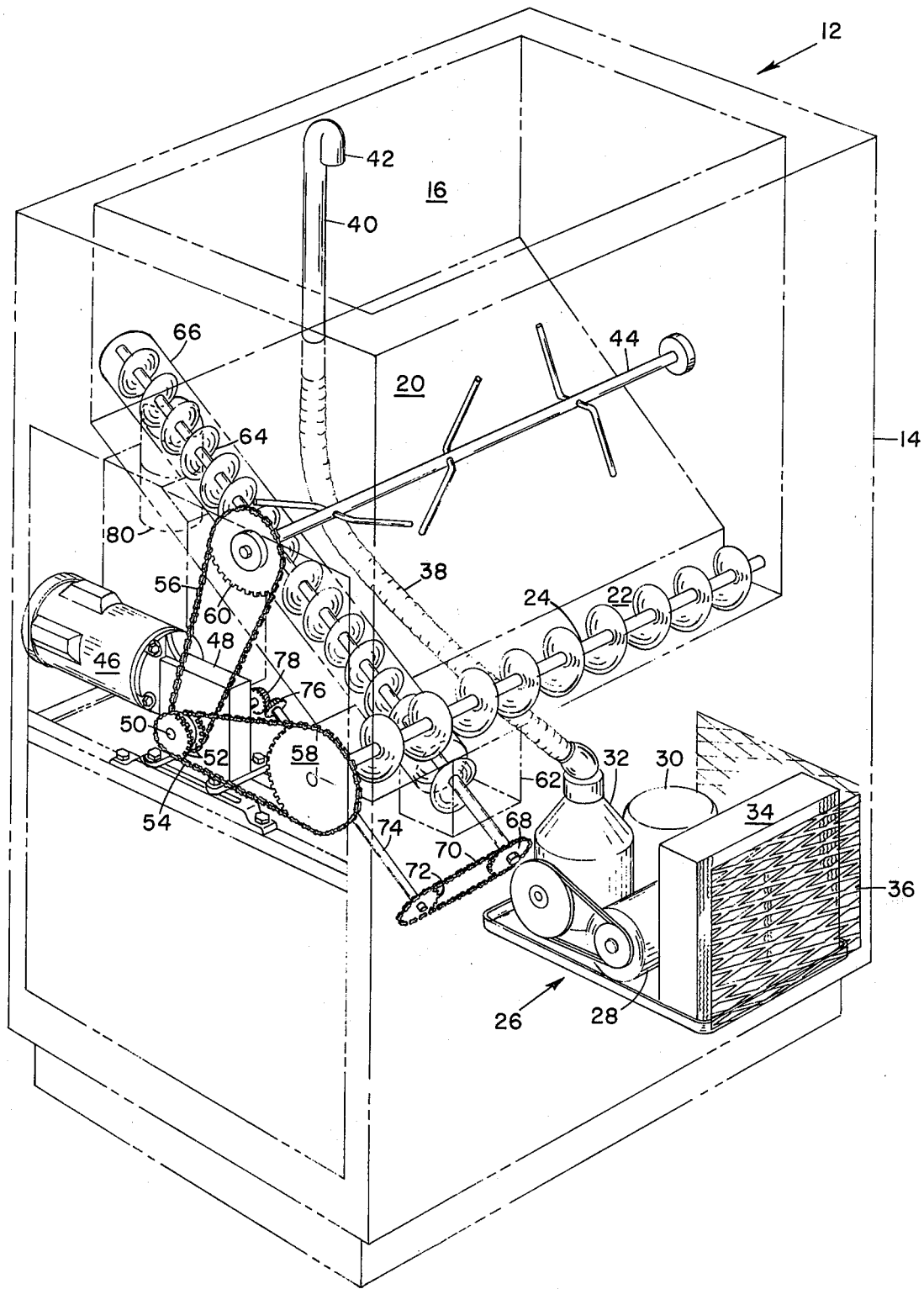
FIG. 1 is a rear perspective phantom view showing the ice making and dispensing portion of this invention.
Figure 2:
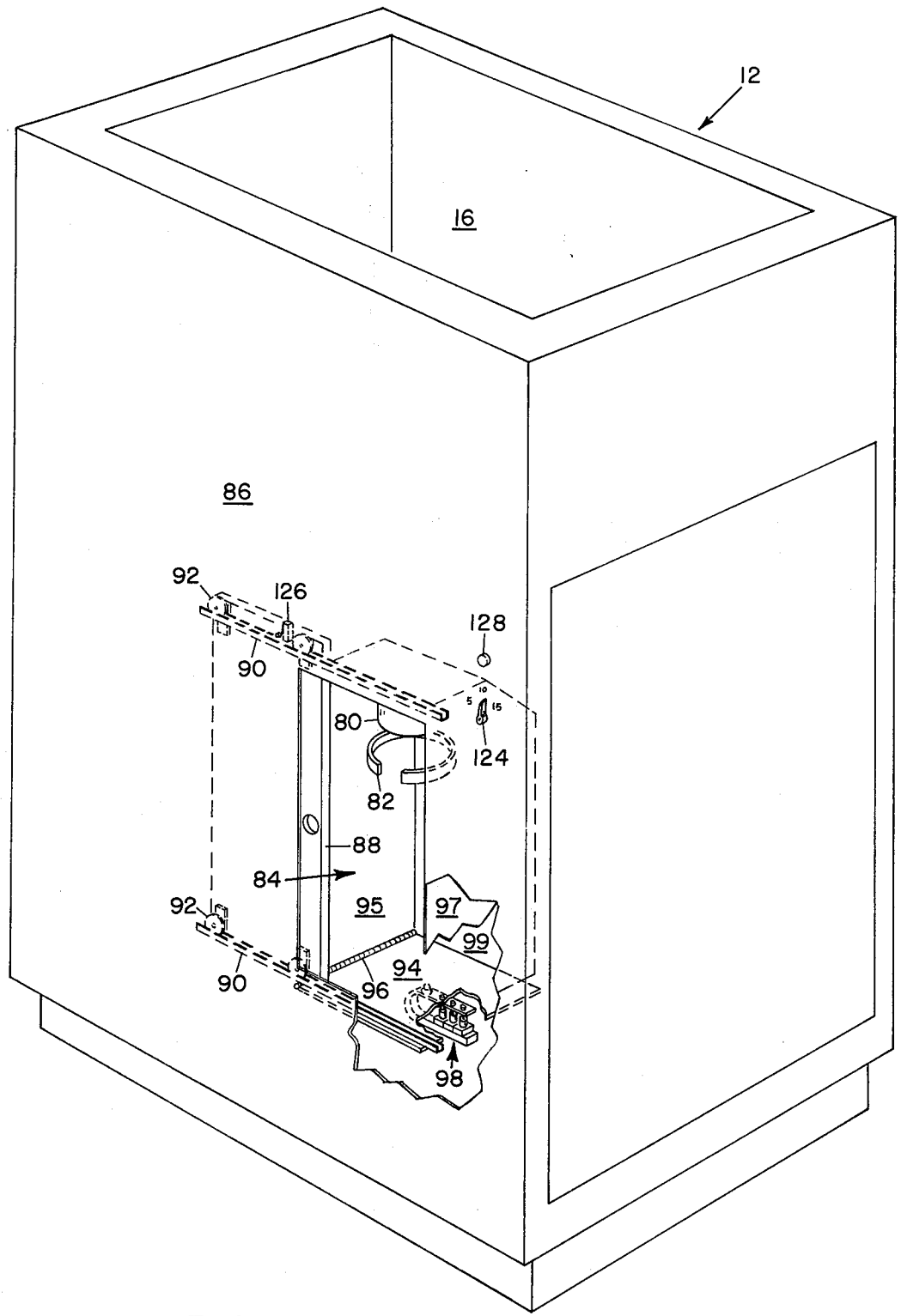
FIG. 2 is a front perspective phantom view showing the ice dispensing portion and the weighing mechanism of the present invention.

Referring to FIGS. 1 and 2 in combination, there are shown front and rear phantom views of the present invention. The preferred form of the present invention comprises an ice cube vending unit represented generally by the reference numeral 12, which includes a housing 14 that can be made from a substance such as stainless steel or aluminum and has an upper bin 16. The upper bin 16 has generally vertical walls except for the sloping lower front wall 20. As ice accumulates in bin 16 in a manner that will be subsequently described, the ice cubes feed by gravity into bottom trough 22, which contains the screw conveyor 24.

Before proceeding further with the dispensing portion of the ice dispensing and weighing unit, a description of how the ice cubes are manufactured is appropriate. A refrigeration unit represented generally by the reference numeral 26 is contained in the bottom of the ice cube vending unit 12. The refrigeration unit 26 is a self contained unit so that upon connection to a source of water and electrical power, ice cubes may be formed by the unit 26. Motor 28 drives the compressor 30 of the refrigeration unit 26. The ice cubes are formed in evaporator 32 with heat from the refrigeration unit 26 being removed through condenser 34 and grill 36 of the ice cube vending unit 12. As the ice cubes are formed in evaporator 32, they are physically pushed up flexible conduit 38 and tubing 40 into upper bin 16. When bin 16 is filled so that ice cubes reach the bottom of elbow 42, a thermostat (not shown in drawings) located immediately below the elbow will open due to a decrease in temperature caused by the ice cubes. The thermostat leads feed through the tubing 40 and flexible conduit 38 back to the refrigeration unit 26 to cut it OFF. Lowering the level of ice cubes reverses this process.

An example of the regrigeration unit 26 just described is manufactured by Whirlpool and is referred to as a Transtec ice system and having a model number of CTBE-4A or CTBE-4W.

After the ice cubes are dispensed through elbow 42 of tubing 40, agitator 44 inside of bin 16 upon starting of motor 46 will move the ice cubes to insure that they slide down sloping lower surface 20 into the bottom trough 22. A source of power used for dispensing ice in the present invention is electrical motor 46, which is connected through a gear reduction unit 48 to drive the mechanical operations of the ice cube vending unit 12. From the gear reduction unit 48, shaft 50 is connected to cogs 52. Cogs 52 by means of chains 54 and 56 drive cogs 58 and 60, respectively. Cog 58 turns the screw conveyor 24 while cog 60 turns the agitator 44; therefore, as the screw conveyor 24 turns, the agitator 44 will simultaneously turn so more ice cubes will slide down into bottom trough 22. Ice contained in bottom trough 22 will be moved to collecting box 62 by means of screw conveyor 24. Inside of collecting box 62 another screw conveyor 64 extends sloping upward through a tubular structure 66. The screw conveyor 64 is turned by means of cogs 68, chain 70 and another cog 72 driven by shaft 74 which has a bevel gear 76 on the opposite end thereof. The bevel gear 76 is connected to a mating bevel gear 78 which is attached to one end of shaft 50. As agitator 44 and screw conveyor 24 turn, screw conveyor 64 will also turn at a rate faster than screw conveyor 24. The faster turning of screw conveyor 64 keeps excessive ice from accumulating in collecting box 62.

The tubular structure 66 containing screw conveyor 64 is immediately under sloping lower front wall 20 of the bin 16. The upper end of the tubular structure 66 is connected to a delivery outlet 80. As ice is raised by the screw conveyor 64 through tubular structure 66, it will drop out the delivery outlet 80 into a bag being held by a retainer 82. (See FIG. 2).

The bag into which the ice cubes will be dispensed is located inside an opening 84 in the front 86 of the ice cube vending unit 12. The opening 84 is covered by a sliding door 88 that slides behind the front wall 86 and is retained in channels 90 by rollers 92. The opening 84 has substantially vertical side walls 95 and 97 and rear wall 99, and a top through which delivery outlet 80 extends. The retainer 82 is attached to the rear wall by any convenient means such as screws, etc. The lower portion of the opening 84 is a hinged plate 44 retained on one side by hinge 96 and supported on the opposite side by a force control switch 98. The bottom of the bag rests on the hinged plate 94.

Figure 3:
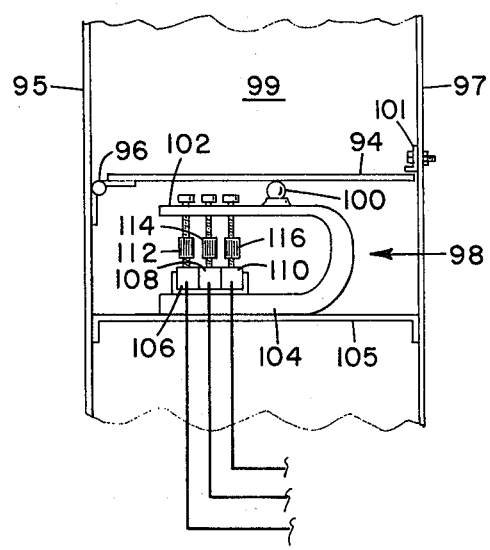
FIG. 3 is a sectional view of FIG. 2 showing the weighing mechanism.

Referring now to FIG. 3 of the drawings, there is shown a front sectional view of the hinge plate 94 and the force control switch 98. An angle retainer 101 prevents an operator from raising the hinged plate 94 and tampering with force control switch 98. As can be seen from the sectional view, the hinge plate 94 is supported on side wall 95 by hinge 96. The opposite side of the hinge plate 94 is supported by bearing 100 attached to the thin upper member 102 of force control switch 98. The bearing surface 100 is free to turn. The lower part of the force control switch 98 has a thick lower surface 104 that is attached to a drain plate 105. The force control switch 98 is a generally U-shaped member with one leg of the "U" being much thinner (102) than the other leg (104). On the thick lower surface 104 of the force control switch 98 is mounted three microswitches numbered 106, 108 and 110. Each of the microswitches 106, 108 and 110 has an adjustment 112, 114 and 116, respectively, that extends down from the thin upper surface 102. Therefore, as ice cubes are dispensed out delivery outlet 80 into the bag being held in position by retainer 82, the weight of the ice contained in the bag rests on hinge plate 94. As the weight of the ice dispensed increases on hinge plate 94 which is supported by bearing 100, the weight forces thin upper surface 102 toward thick lower surface 104 as ice inside the bag accumulates. By the setting of the adjustments 112, 114 and 116, the point of triggering microswitches 106, 108 and 110, respectively, can be accurately set.

Figure 4:
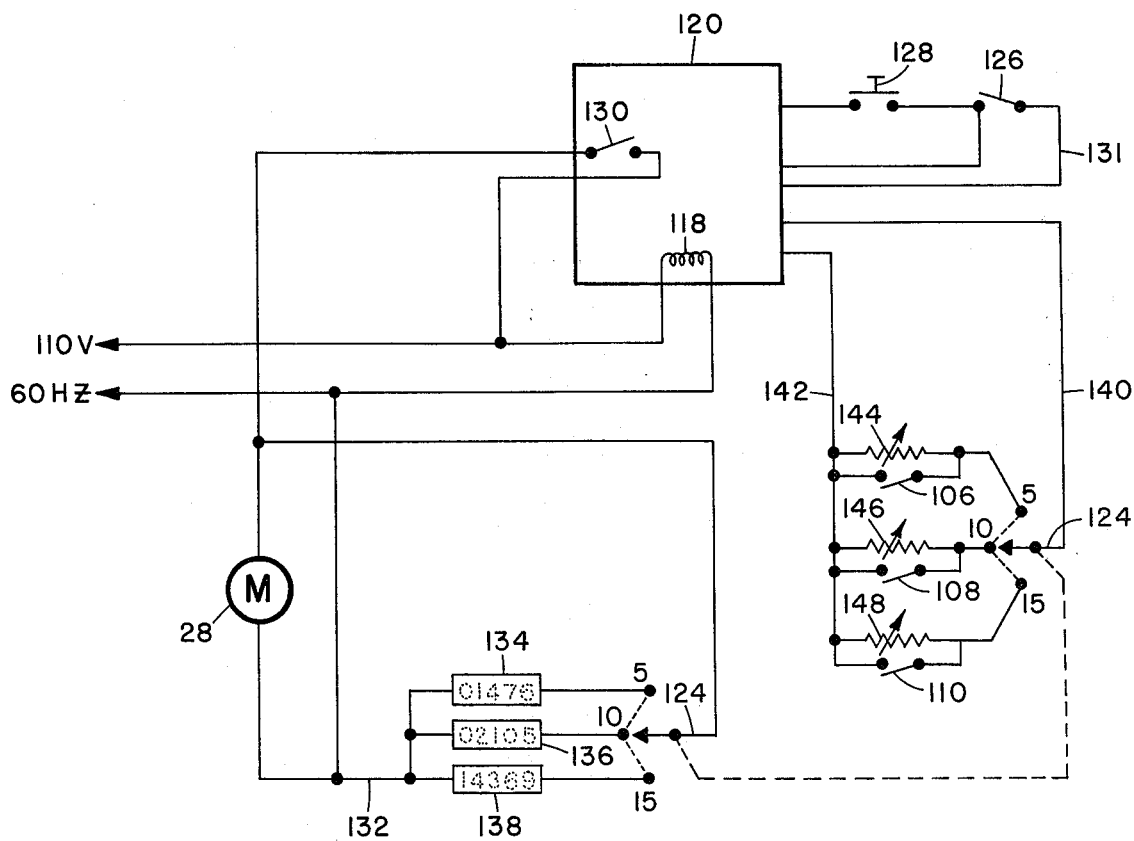
FIG. 4 is a schematic diagram of the electrical controls for the present invention.

Referring now to the electrical control portion of the present invention, attention is directed to FIG. 4, which is a representative schematic diagram of the electrical controls. One hundred ten volts, 60 cycle electric power is connected to internal coil 118 of solid state time delay relay 120. When an individual wants a bag of ice, he would select the desired weight by positioning switch 124, to 5, 10 or 15 pound bags. Electrically this would switch the position of switch 124 to one of the three positions indicated in the schematic of FIG. 4. Presently switch 124 is set for a ten pound bag of ice. If the sliding door 88 was closed, microswitch 126 would be closed by the force of one of the rollers 92, thereby closing the normally open microswitch 126. With the sliding door 88 being closed and the select switch in the position for a 10 pound bag of ice, a person may push the dispense button 128, thereby starting the operation of the ice dispensing and weighing unit. Power is applied to the time delay relay 120 through line 131 so that upon the closing of microswitch 126 and the dispense button 128 the time delay relay 120 is set. Simultaneously with the setting of the time delay relay 120 normally open switch 130 is closed, thereby applying power to motor 28. The opposite side of motor 28 is connected to the common side 132 of counters 134, 136 and 138 and the source of electric power. Connected to the normally open switch 130 is the opposite side of select switch 124 which is a double pole, double throw switch. Therefore, upon the closing of normally open switch 130 and select switch 124 is in the 10 pound select position, counter 136 will be triggered for one count indicating that one ten pound portion of ice has been dispensed.

As a sufficient amount of ice accumulates in the bag and the weight presses down on hinge plate 94, microswitch 106 will close upon reaching five pounds; however, since microswitch 106 is connected to a dead end lead that was not connected through select switch 124, nothing will happen upon reaching 5 pounds. Upon reaching ten pounds, adjustment 114 will activate microswitch 108, which forms a closed circuit through select switch 124 back to solid state timed delay relay 120. Upon the forming of this closed circuit with solid state timed delay relay 120, all power will be terminated by opening normally open switch 130. If the select switch 124 had been set for fifteen pounds, microswitch 110 would have closed (if adjustment 116 is properly set) upon reaching the fifteen pound limit, thereby terminating the power being delivered through normally open switch 130.

Leads 140 and 142 are connected across the timed delay portion of timed delay relay 120; however, the resistive portion that forms the time constant for timed delay relay 120 is connected externally through leads 140 and 142. Therefore, by putting variable resistors 144, 146 and 148 in parallel with microswitches 106, 108 and 110, respectively, a safety cutoff can be provided. Variable resistor 144 would be set so there would be sufficient amount of time to fill a five pound bag of ice under the worst conditions of dispensing the first bag of ice of the day. Variable resistor 146 would be set so that there would be a sufficient amount of time to dispense a 10 pound bag of ice under the worst conditions. Likewise, variable resistor 148 would be set in order to dispense a 15 pound bag of ice under the worst of conditions. In the present situation, where the select switch 124 is set for a 10 pound bag of ice, if microswitch 108 had not closed by the time set into the time delay relay 120 by variable resistor 146, the time delay relay 120 would automatically shut off the ice dispensing unit by opening normally open switch 130.

It should be understood that dispense button 128 is spring loaded so that after pushing button 128 to make contact and start time delay relay 120, the connection is broken upon releasing the button 128. Also, microswitch 126, which operates inside the sliding door 126 and is pressed down by the inside roller 92, completely shuts down the ice dispensing and weighing unit upon the partial opening of the sliding door 88. The entire cycle would have to be started again. If after applying power to time delay relay 120 by pushing dispense button 128, and microswitch 126 is in the closed position, a person should open the sliding door 128, thereby opening switch 126, the time delay relay 120 would be immediately reset and normally open switch 130 opened. Counters 134, 136 and 138 are counters commonly used in the industry to count the number of times a unit has been used. Each time the motor 28 is energized, one of the counters 134, 136 and 138 will add an additional count. At the end of a period of time, the owner of the ice dispensing and weighing unit can determine the number of a particular size bag that have been dispensed from the unit.

The solid state timed delay relay 120 is a common type with a representative one being manufactured by Magnecraft Electric Company located in Chicago, Ill. and having a part number of W211ACPSRX-7. The range of time delay relay 120 is from 1 second to 180 seconds with a maximum amperage of 10 amps and voltage ranging between 110 and 130 volts AC. Leads 140 and 142 alter the time constant of time delay relay 120 according to which of the variable resistors 144, 146 or 148 is connected across time delay realy 120. The solid state time delay relay 120 is of the standard socket plug-in type.

The force control switch 98 with the microswitch 106, 108 and 110 mounted thereon can be purchased as a standard commercial item from W. C. Dillon & Company, Inc. in Van Nuys, Calif. under the title of Force Control Switch, Model No. FCS-C-12. Also premounted in force control switch 98 are the adjustments 112, 114 and 116 for microswitches 106, 108 and 110, respectively. The bearing 100 is already attached to the thin upper surface 102 of the force control switch 98.

By the use of the force control switch 98 as described in conjunction with the present invention, a much more accurate measurement can be obtained to determine the weight of the ice inside the bag. By use of the force control switch as just described, bags of ice within a half pound of the preselected amount can be dispensed repeatedly for extended periods of time. Therefore, the present machine weights are set for 5¼, 10¼ and 15¼ pounds to insure the weight of the bag of ice is at least the selected amount and not more than 5½, 10½ and 15½ pounds, respectively. Previous ice dispensing units used a couple of pounds overfeed to account for worst case conditions, which is not required in the present invention. Also, previous inventions that used a type of spring weighing device had to be adjusted fairly frequently to account for changes or variations in spring strength. The force control switch 98 may be used many thousands of times with very little or no effect on the measurement previously set in by adjustments 112, 114 and 116.

Also, the present invention has two important safety features wherein, first, all ice being dispensed from the machine will be stopped upon the opening of the sliding door 88, and second, variable resistors 144, 146 and 148 provide for worst case conditions in which all power will be removed from the dispensing unit if the bag should have filled to the predetermined weight upon the elapse of a predetermined amount of time.

It should be understood that the force control switch acts under the same basic principle as a leaf spring commonly found in automobiles. A leaf spring may be suitable for weighing, and give the desired accuracy, if the position is controlled to set in the initial adjustments. A coil type of spring is totally unsatisfactory from an accuracy standpoint. In using a leaf spring, the platform or drain plate on which the leaf spring is mounted simply forms one side of the U.

We claim:

1. An ice cube dispensing and weighing machine connected to a source of power and water, said machine comprises;
 a. refrigeration means for forming ice cubes from said water;
 b. a bin positioned to receive ice cubes from said refrigeration means;
 c. means for discharging ice cubes from said bin into a container, said discharging means being driven by said power source;
 d. means for weighing the ice contained in said container, said weighing means including a force control switch supporting said container, said container upon receiving a predetermined amount of ice cubes therein activates said force control switch to terminate power to said discharging means, said force control switch including switching means and means for rigidly mounting said switching means and further means for accurately setting said switching means operation point, said force control switch having accurate repeatability over extended use;
 e. control means for selecting one of a variety of said predetermined amounts, said force control switch having a series of said switching means so that when the weight of said ice cubes forces a first portion of said force control switch toward a second portion, the switching means will activate as said predetermined amounts are reached, said power to said discharging means being terminated upon reaching the selected predetermined amount;
 f. time delay cut off means interconnected with said control means so that, if a sufficient amount of time has passed so that under worst case conditions said selected predetermined amount would have been dispensed, power to said discharging means is terminated; and
 g. said first portion of said force control switch will flex as the weight increases while said second portion provides said rigid mounting for said switching means.

2. The ice cube dispensing and weighing machine as recited in claim 1 wherein;

said bin includes a sloping wall; and said discharging means includes an agitator in said bin and a first screw conveyor along the bottom of said sloping wall, said first screw conveyor delivering ice cubes to a second screw conveyor for lifting said ice cubes along the underside of said sloping wall and dispensing said ice cubes into said container.

3. The ice cube dispensing and weighing machine as recited in claim 2 wherein said refrigeration means is located below said bin and forces said ice cubes up through a tubing into said bin.

4. The ice cube dispensing and weighing machine as recited in claim 1 wherein said container rests upon a hinged plate with one side of said hinged plate being supported in the horizontal position by said force control switch which is generally U-shaped.

5. The ice cube dispensing and weighing machine as recited in claim 4 is totally enclosed with said container and hinged plate being behind a door, upon opening said door and a switch controlled thereby, all power to said discharging means is terminated and said time delay cutoff means is reset.

6. The ice cube dispensing and weighing machine as recited in claim 5 has operator controls of a selector switch to select one of the predetermined amounts, and a momentary switch to start said machine.

7. The ice cube dispensing and weighing machines as recited in claim 6 includes a plurality of counters at least equal in number to the number of said predetermined amounts, said counters counting the number of portions of ice dispensed in said containers of a respectively predetermined amount that has been dispensed.

8. The ice cube dispensing and weighing machine as recited in claim 7 wherein said time delay cutoff means is adjustable by external variable resistors to change time constant of said time delay cutoff means.

* * * * *